United States Patent Office 2,967,471
Patented Jan. 10, 1961

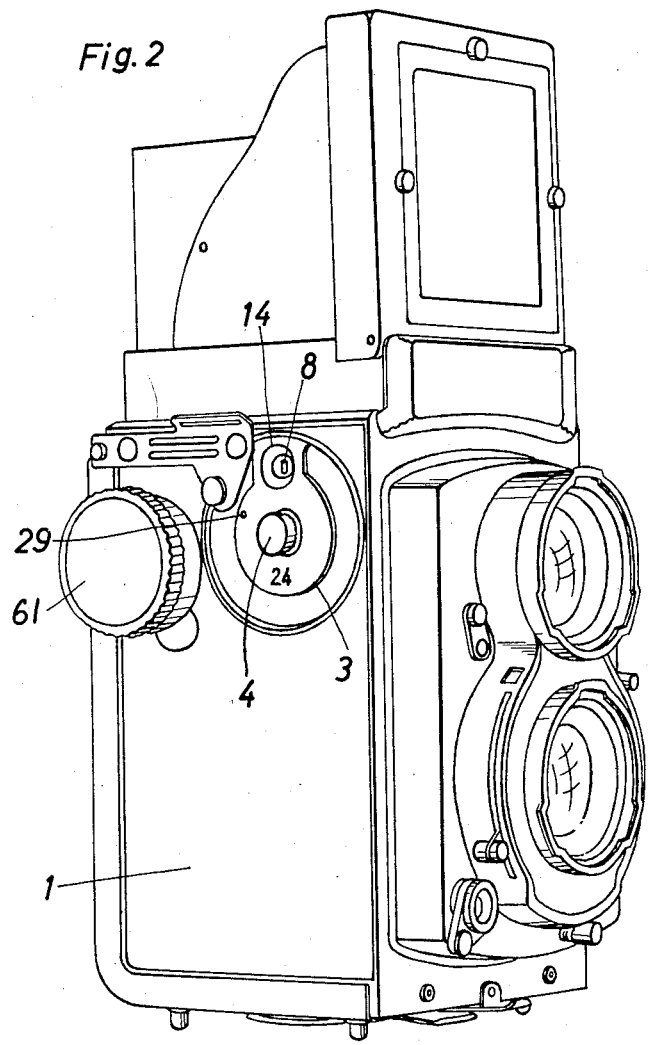

2,967,471

FILM ADVANCE MECHANISM FOR MULTI-FORMAT ROLL FILM CAMERAS

Friedrich Sommermeyer, Braunschweig, Germany, assignor to Franke & Heidecke, Fabrik Photographischer Prazisions-Apparate, Braunschweig, Germany, a firm of Germany Filed Mar. 17, 1958, Ser. No. 721,857

7 Claims. (Cl. 95—31)

The present invention relates to film advance mechanisms for multi-format roll film cameras and, more particularly, to interchangeable mechanisms for controlling and indicating the advance of film by different distances.

In a multi-format camera, the various film sizes for which the camera has been designed each has a particular amount of advance from frame to frame. Various arrangements have been suggested to make the amount of film advance variable, but none of them is entirely satisfactory. Many of these arrangements involve separate mechanisms for each film frame size built permanently into the camera, which mechanisms may be selectively put into use. These have the disadvantages of being costly and complex, and in some cases an accidental change-over during the advance of the film might occur, the result being overlapping pictures or damage to the driving mechanisms. Furthermore, many existing devices do not offer a wide choice of formats.

Accordingly, an object of this invention is to provide a new and improved variable film advance mechanism for a multi-format roll film camera.

Another object of this invention is to provide a new and improved film advance mechanism for advancing the film by the different amounts required for the different film frame sizes used in a multi-format camera, which mechanism minimizes the complexity of the camera and prevents an accidental change-over while the camera is in use.

Yet another object is the provision of a new and improved variable film advance mechanism allowing a wide choice of formats without susbtantially modifying the handling of the camera.

A further object is the provision of a new and improved variable film advance mechanism which is relatively simple in operation and inexpensive to manufacture, and which may be employed with existing camera parts without substantially modifying their mode of operation.

These and other desirable objects may be attained in the manner disclosed as an illustrative embodiment of the invention in the following description and in the accompanying drawings forming a part hereof, in which:

Fig. 2 is a perspective view of the camera of Fig. 1 in a position ready for exposure, with the film counter and control unit assembled into place and with the camera back closed;

The same reference numerals throughout the several views indicate the same parts.

While the present invention, at least in its simplest form, is not limited to any particular kind or style of roll film camera, it is here disclosed by way of example in connection with a twin lens reflex camera identified by the trademark "Rolleicord," manufactured by Franke & Heidecke, of Braunschweig, Germany, and widely known and used throughout the United States. The following disclosure of the invention presupposes familiarity with the main constructional features of the "Rolleicord" camera, and for those not already familiar with the construction of the camera, reference may be made to the book "Rollei Photography, Handbook of the Rolleiflex and Rolleicord Cameras," by Jacob Deschin, published in 1952 by Camera Craft Publishing Co., of San Francisco, California.

Figure 1:
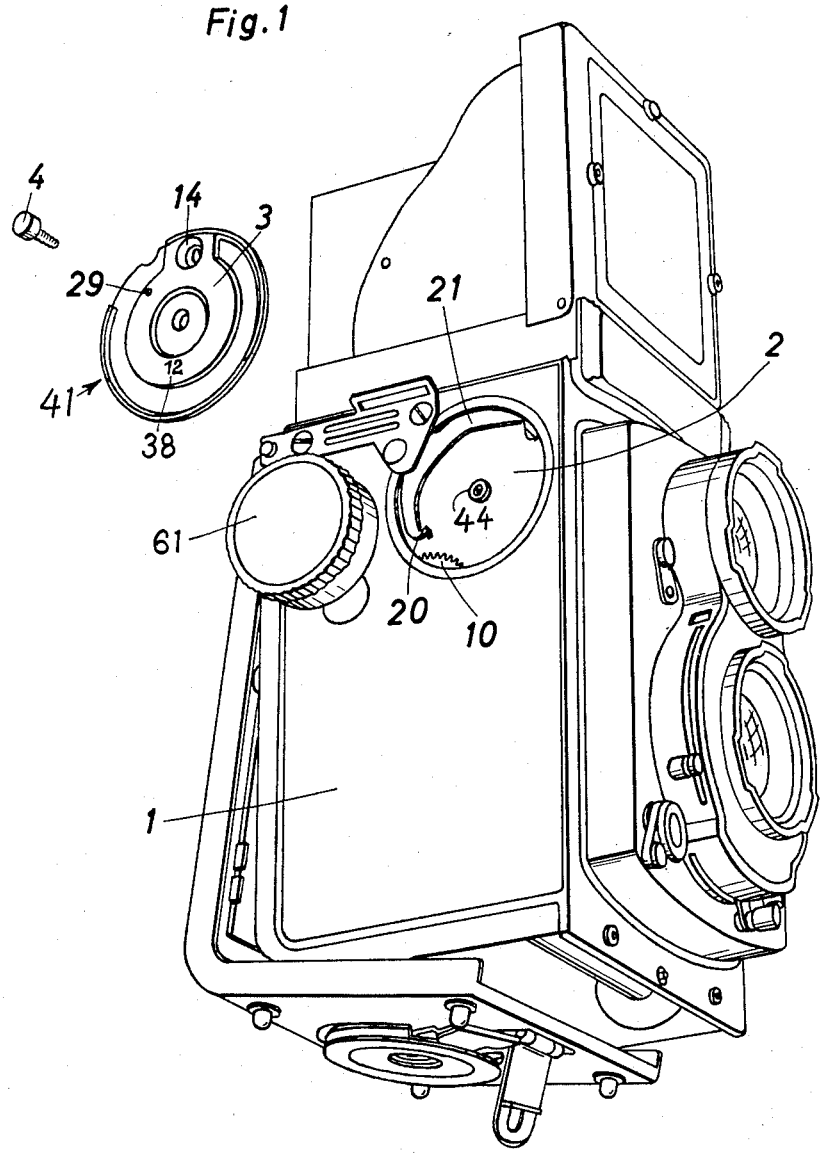
Fig. 1 is a perspective view of a roll film camera embodying the present invention with the film counter and control unit shown in exploded relation to the camera body and with the camera back partially open.

In Fig. 1 is shown a multi-format roll film camera body 1 of the type referred to above. The right hand side wall of the camera body is provided with an opening 2, preferably circular in shape. The opening 2 receives an interchangeable film counter and control unit indicated in general at 41, having a cover plate 3 which is appropriately provided with a marker 38 giving the number of frames of the film for which the particular unit 41 is designed to be used. As will subsequently be more clear, the camera is equipped with a plurality of interchangeable units 41, each unit being used to provide the proper film advance for a particular film frame size. Each unit 41 cooperates in a manner to be explained in greater detail hereafter with an intermediate gear 10 located within the camera body but visible through the opening 2, and also with a lever 21 having a locking arm 20. The gear 10 is part of a film metering mechanism whereas the lever 21 is part of a film wind lock mechanism. The selected unit 41 is assembled to the camera body 1 by means of an appropriate fastening, such as a screw 4, which passes through the unit and is received in a threaded opening 44 on the camera body.

In Fig. 2 the camera is shown ready for exposure with an exposure numeral 8, in this case "0," visible through an aperture 14 in the cover plate 3. It is noted that when assembled, the cover plate 3 is substantially flush with the side of the camera and presents a harmonious appearance.

Figure 4:
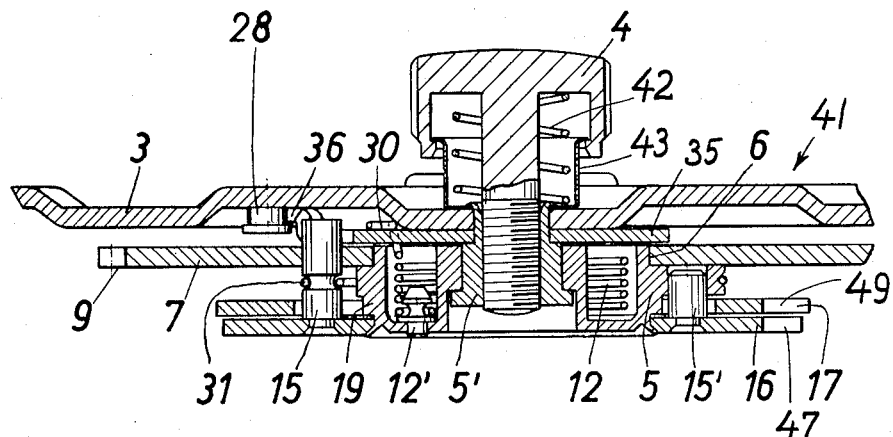
Fig. 4 is a cross-section of the unit of Fig. 3 taken substantially on the line 4—4 thereof.
Figure 3:
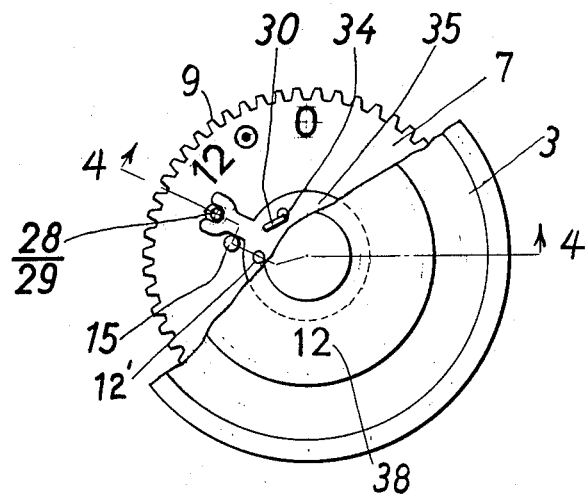
Fig. 3 is a front elevation of the counter and control unit, with parts broken away.
Figure 5:
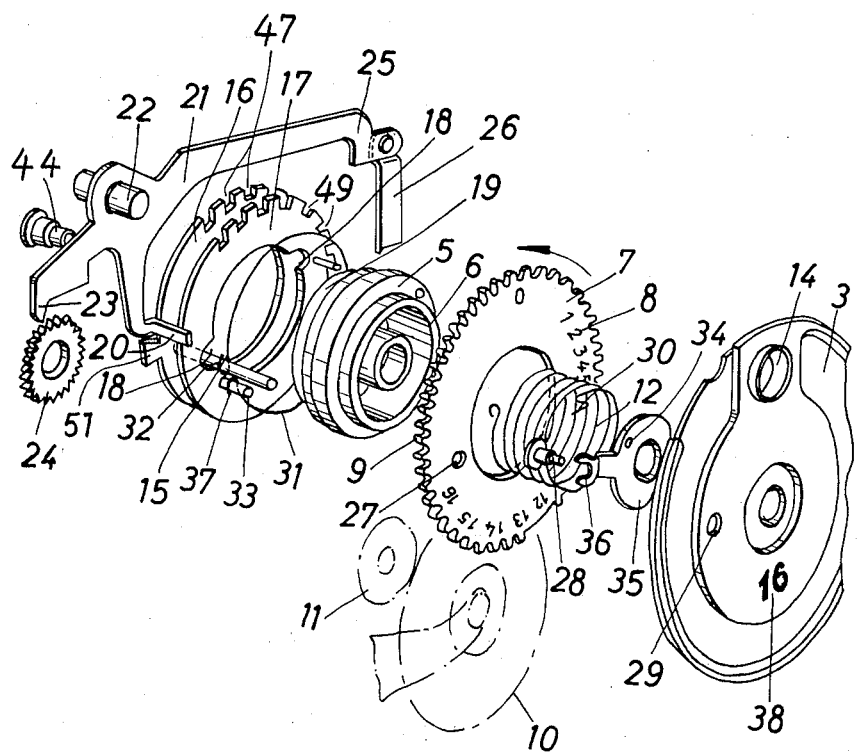
Fig. 5 is an exploded view of a counter and control unit and of cooperating portions of the camera of Figs. 1 and 2.

Referring to Figs. 3 to 5, there is secured to the cover plate 3 a disk 35 having a radial extension 36 which has an outer forked end. The forked end extends over a pin 28 which passes through an aperture 29 in the cover plate 3 and is riveted or otherwise suitably fixed therein. A bushing 5' is received in alined central apertures in the cover plate 3 and the disk 35, and is staked or riveted to the plate 3. A shoulder on the bushing holds the disk 35 tight against the inner face of the plate 3, preventing separation in an axial direction, while the pin 28 prevents rotation of the disk relative to the plate.

The retaining screw 4 is conveniently a plunger type which is spring urged outwardly away from the cover plate 3 by means of a coil spring 42 surrounding the shank and encased in a flanged housing 43, the shank of the screw extending through the bushing 5'. The inner flange of the housing 43 is pinched beneath the turned over outer end of the bushing 5', and the outer flange of the housing engages an internal shoulder in the head of the screw 4 to limit the axial outward movement of the screw, thus securing together the screw 4, the cover plate 3, the disk 35, and the bushing 5', and preventing the screw from being accidentally mislaid while the detachable control unit is not in use. When placing the unit on the camera, the screw is pushed axially inwardly against the slight force of its spring 42, through the smooth (non-threaded) bore of the bushing 5', until the threaded inner end of the screw projects far enough inwardly to engage with and be screwed into the threaded socket 44 in the camera body.

Rotatably mounted on the bushing 5' between an enlarged rear end thereof and the disk 35, is an annular hub member or jacket 5. The jacket 5 is cup-shaped in radial cross section, so as to have a forwardly-faced annular cavity or recess, and receives a return spring 12 coiled circumferentially within its recess. One end 30 of the return spring 12 extends through an aperture 34 in the disk 35 and is bent over to secure it in place. The other end 13 of the return spring 12 is fastened to a pin 12' which is fixed to the rear wall of the hub 5.

Mounted on a reduced shoulder at the front end 6 of the hub or jacket 5 is a counter wheel or gear 7 having peripheral gear teeth 9. The exposure numerals 8 previously mentioned are suitably printed or etched or the like on the front face of the counter wheel or gear 7 so as to be visible through the aperture 14 in the cover plate 3. As illustrated, the unit shown in Fig. 3 is for a film format of 12 frames and that shown in Fig. 5 is for a film format having 16 frames, and consequently numerals 0 to 12 or 0 to 16, inclusive, as the case may be, appear on wheel 7, near the outer edge, while the number of frames for which the unit is designed is indicated at 38 on the front face of the cover plate 3.

A pair of notched disks 16 and 17 are mounted on separate shoulders at the rear end of the hub or jacket 5. The rear disk 16 is staked or tightly clinched to the jacket 5 and may be additionally interconnected therewith as by a pin 15' which is riveted to the disk 16 and extends forwardly into an aperture in a radial projection on the jacket 5. The rear disk 16 also carries a pin or rod 15 riveted to the disk diametrically opposite the pin 15' and extending forwardly to a tight fit in an aperture 27 in the counter wheel 7. As will subsequently be more clear, the rod 15 is sufficiently long to strike the forked projection 36 of the disk 35 to limit the rotation of the counter wheel 7 relative to the cover plate 3. On account of these pins 15 and 15', the members 5, 7, and 16 are rigidly connected and cannot rotate relative to each other, but all of them can rotate together as a unit, on the bushing 5', until the forward end of the pin strikes the member 35, 36.

The disk 17 is mounted on the jacket 5 so as to be corotatable with counter wheel 7 and disk 16 and additionally so as to have limited rotation relative to the rear disk 16. Thus the disk 17 is rotatable on its shoulder on the hub 5, and the pins or rods 15 and 15' extend through recesses 18 in the disk 17, the recesses 18 being wider in a circumferential direction than the diameters of the rods 15 and 15', so as to provide circumferential clearance. It is also to be noticed that the disk 17 has a slightly larger radius than the rear disk 16 for a purpose to be explained. Each of the disks 16 and 17 has a series of peripheral notches 47 and 49, respectively. The number and spacing of these notches corresponds to the number and spacing of the exposure numerals 8 on counter wheel 7, i.e., there is one notch for each film number, none being provided for the "0" marking. The rear disk 16 furthermore has a radial projection 51 extending from its outer circumference. The disk 17 is urged slightly counterclockwise ahead of disk 16, so that the notches 49 are displaced counterclockwise from the notches 47. For this purpose, a spring 31 interconnects the two disks. The spring 31 has a hook-eye 32 at one end embracing the rod 15 and has at its other end a hook-eye 37 which is secured to a pin 33 extending from and fixed to one face of the disk 17. The pin 33 is displaced slightly counterclockwise of the recess 18.

With the interchangeable unit 41 removed from the camera, the counter wheel 7 and the parts rotatable with it assume a position relative to the cover plate 3 so that the zero numeral is visible through the aperture 14 in the cover plate. The return spring 12 constantly urges the hub or jacket 5 and the counter wheel 7 in a counterclockwise direction until limited by the abutment of the pin 15 with the forked extension 36 of the disk 35. The spring 31 urges the disk 17 to a position slightly counterclockwise in advance of the disk 16. Upon insertion of the interchangeable unit 41 into the camera recess 2 and tightening of the plunger type screw 4 into the threaded opening 44, the previously mentioned locking arm 20 slidably engages the circumference of the disk 17 and the previously mentioned gear 10 meshes with the gear teeth 9 of the counter wheel 7.

The locking arm 20 is part of a film wind lock mechanism and is carried by a bellcrank lever 21 which is pivoted about a stud 22. To the other end of the bellcrank 21 is pivoted a link 26 which is connected to a shutter release means (not shown). A locking pawl 23 extends from the bellcrank 21 and is so located as to pivot in the same direction as the locking arm 20 when the bellcrank 21 is pivoted. Locking pawl 23 is engageable with a ratchet wheel 24 of the film winding mechanism. These elements are similar to the corresponding elements disclosed in United States Patent 2,773,438, to H. Bretthauer, et al., issued December 11, 1956. The intermediate gear 10 is driven by the feeding motion of the film by means of a metering roller or wheel 11, in a manner similar to that disclosed in the foregoing patent.

To continue the operation, the film is advanced by actuating the film winding mechanism, by turning the film winding knob 61 on the right hand side wall of the camera, the intermediate gear 10 thus being set in operation by the metering roller 11. The counter wheel 7 is consequently rotated until the numeral "1" appears in the aperture 14. At this point, the first of the notches 49 in the disk 17 comes into the path of the locking arm 20. Since the disk 17 is larger than the disk 16, the locking arm drops into this first notch 49. Because of the circumferential clearance of the recesses 18, the disk 16 continues its counterclockwise movement until the first of the notches 47 comes into the path of the locking arm 20. The locking arm 20 then drops into this first notch 47, rotating the bellcrank 21 so that the locking pawl 23 moves into engagement with the ratchet wheel 24. The film winding mechanism is consequently locked in a fashion similar to those described in the aforementioned patent.

On releasing the shutter the bellcrank 21 is rocked in a clockwise direction by the link 26, whereby the locking arm 20 is lifted out of the notches 47 and 49 in the respective disks 16 and 17. The spring 31 then urges the disk 17 counterclockwise relative to the disk 16 within the limits of the recesses 18. The locking arm 20 thus bears on the circumference of the disk 17, the locking pawl 23 being also moved out of engagement with the ratchet wheel 24 and being prevented from immediately reengaging. At this point the film winding mechanism is unlocked and can be actuated again until the number "2" appears through the opening 14, whereupon the locking process is repeated. In this way, the film can be intermittently advanced and exposed until the highest frame number is reached, this being "16" in the example of Fig. 5. For the subsequent winding operation, the disks 16 and 17 do not have any notches, so that the trailing end of the film can be wound continuously onto the film take-up roll.

On opening the back of the camera, the film winding gear 10 and the metering roller 11 are released in a known manner, for instance, see the above-mentioned patent, and the loaded return spring 12 returns the counter wheel 7 and the disks 16 and 17 to the "0" position. Of course, if the interchangeable unit 41 is extracted from the camera recess 2, the same result occurs since the return spring 12 is again able to move the counter wheel 7 to the zero position.

As has been explained, a plurality of the interchangeable counter and control units 41 are provided with the camera, one for each of the desired formats. Each of the units 41 operates in a similar manner. Constructionally they are similar except that the spacing and number of notches 47 and 49 varies according to the number and length of the frames on the different film sizes. Additionally, of course, the exposure numerals 8 on the counter wheels 7 and the markers 38 on the cover plates 3 will be different for the different film sizes.

Besides the interchangeable counter and control units, a format mask is also provided for each of the desired film frame sizes. The use of format masks is well known and need not be further explained. To change film sizes, all that is required is to select and assemble the appropriate counter and control unit 41 and format mask. The change-over to a different film winding stroke is easily and quickly accomplished by interchanging the small unit 41. The question of formats is decided when inserting the film, so that no change in the format is necessary during the running of the film. There is thus no chance of an accidental change-over while the camera is in use, with a consequent possible overlapping of pictures or damage to the driving mechanism. Since the owner of the camera often decides to employ a certain format a relatively long time, he does not attach particular importance to easier convertibility.

By the use of the present invention, one camera model can be supplied with any desired number of variations of format. By the combination of an appropriate format mask with the corresponding counter and control unit 41, an unlimited choice of formats is offered without the handling of the camera being modified in any way. For example, if the camera is designed to take roll film of the size commercially known as "120," interchangeable control units and interchangeable masks may be provided to enable the taking, on such film, of 12 exposures of size 6 x 6 cm., or 16 exposures of size 4 x 5½ cm. or 4 x 4 cm., or 24 exposures of size 28 x 40 mm. or size 24 x 36 mm.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A multi-format roll film camera comprising a camera body, film advancing means, a single locking means for locking said advancing means against advancing movement, a single end gear driven by advancing movement of the film, and a side wall having an aperture therein, said advancing means, locking means, gear, and wall all being mounted on said body, characterized by the provision of a detachable and interchangeable cover plate for closing said aperture, means for detachably securing said cover plate in closing relation to said aperture, a gear rotatably mounted non-removably on said cover plate and meshing with said first named gear to be driven thereby, and a notched disk also rotatably mounted non-removably on said cover plate and connected to said second named gear to be driven thereby, said notched disk engaging said locking means to control said locking means to lock said film advancing means upon predetermined movement of said second named gear.

2. A multi-format roll film camera comprising a camera body, film advancing means, locking means for locking said advancing means against advancing movement, a gear driven by advancing movement of the film, and a side wall having an aperture therein, said advancing means, locking means, gear, and wall all being mounted on said body, characterized by the provision of a detachable and interchangeable cover plate for closing said aperture, means for detachably securing said cover plate in closing relation to said aperture, a gear rotatably mounted on said cover plate and meshing with said first named gear to be driven thereby, a first notched disk also rotatably mounted on said cover plate and rigidly connected to said second named gear to turn therewith, a second notched disk also rotatably mounted on said cover plate coaxially with said first notched disk to turn bodily therewith and mounted for limited rotation relative to said first disk, spring means tending to turn said second named gear and both of said notched disks bodily in one direction to an initial starting position, said first named gear driving said second named gear, during film advancing movement, in an opposite direction, and second spring means tending to turn said second notched disk relative to said first notched disk in said opposite direction, said locking means on the camera body engaging with and being controlled by said notched disks to lock said film advancing means at the conclusion of predetermined increments of motion of said second named gear and notched disks.

3. A construction as defined in claim 2, in which said cover plate has an observation window, and in which said second named gear has a series of film frame identifying numerals successively visible through said window as said second named gear is turned.

4. The combination with a multi-format roll camera having film wind lock means and film winding means, of an interchangeable film counter and control unit comprising a cover plate, a counter wheel having a plurality of exposure number indications and having peripheral gear teeth engageable with said film winding means, a first and a second disk each having a plurality of peripheral notches arranged in a pattern in accordance with said exposure number indications, said film wind lock means being adapted to bear on the periphery of said second disk and to be engageable with said notches, means mounting said counter wheel and disks for corotation relative to said cover plate and for limited rotation of said second disk relative to said first disk, spring means urging said second disk to a position rotationally displaced from that of said first disk, and return spring means and stop means for urging said counter wheel and disks toward a zero position.

5. In a multi-format roll film camera having a film winding means including a film winding gear and a film wind lock means including a bellcrank lever having a locking arm and a locking pawl engageable with a ratchet wheel, the combination therewith of a removable film counter and control unit, said unit including a cover plate, a counter wheel having peripheral gear teeth engageable with said film winding gear, a first and a second disk each having a series of peripheral notches engageable with said locking arm, means mounting said counter wheel and disks for corotation relative to said cover plate and for limited rotation of said second disk relative to said first disk, spring means urging said second disk to a position counterclockwise ahead of said first disk, and return spring means and stop means for urging said counter wheel and disks toward a zero position.

6. In a multi-format roll film camera having a film winding means including a film winding gear and a film wind lock means including a bellcrank lever having a locking arm and a locking pawl engageable with a ratchet wheel, the combination therewith of a removable film counter and control unit, said unit including a cover plate having an aperture, a counter wheel having peripheral gear teeth engageable with said film winding gear and having a plurality of exposure number indications successively visible through said aperture, a first and a second disk each having a series of peripheral notches selectively engageable with said locking arm, said second disk being larger than said first disk, means for mounting said counter wheel and disks for corotation relative to said cover plate and for limited rotation of said second disk relative to said first disk, spring means for urging said second disk to a position counterclockwise ahead of said first disk, and return spring means and stop means for urging said counter wheel and disks toward a zero position.

7. In a multi-format roll film camera having a film winding means including a film winding gear and a film wind lock means including a bellcrank lever having a locking arm and a locking pawl engageable with a ratchet wheel, the combination therewith of a plurality of interchangeable film counter and control units, each unit including a counter wheel having peripheral gear teeth engageable with said film winding gear and including a first and a second disk each having peripheral notches selectively engageable with said locking arm, said notches on different units having different spacings according to the film advance desired, means on each of said units for mounting its respective said counter wheel and disks for corotation and for limited rotation of said second disk relative to said first disk, spring means urging said second disk to a position clockwise ahead of said first disk, and return spring means for urging said counter wheel and disks to a zero position.

References Cited in the file of this patent
UNITED STATES PATENTS

| | | |
|---|---|---|
| 1,556,868 | Murray | Oct. 13, 1925 |
| 2,289,827 | Crumrine | July 14, 1942 |
| 2,301,956 | Kuppenbender et al. | Nov. 17, 1942 |
| 2,563,811 | Barnes | Aug. 14, 1951 |

FOREIGN PATENTS

| | | |
|---|---|---|
| 727,352 | Germany | Nov. 18, 1952 |